April 17, 1934.   E. C. BIEWEND ET AL   1,955,220
LATHE
Filed June 20, 1932   6 Sheets-Sheet 1

INVENTORS
ERIC C. BIEWEND
WALTER R. KONKLE
HARRY L. KONKLE
BY Chappell
and Earl ATTORNEYS April 17, 1934.  E. C. BIEWEND ET AL  1,955,220
LATHE
Filed June 20, 1932  6 Sheets-Sheet 2

INVENTORS.
ERIC C. BIEWEND
WALTER R. KONKLE
HARRY L. KONKLE
BY Chappell & Earl
ATTORNEYS.

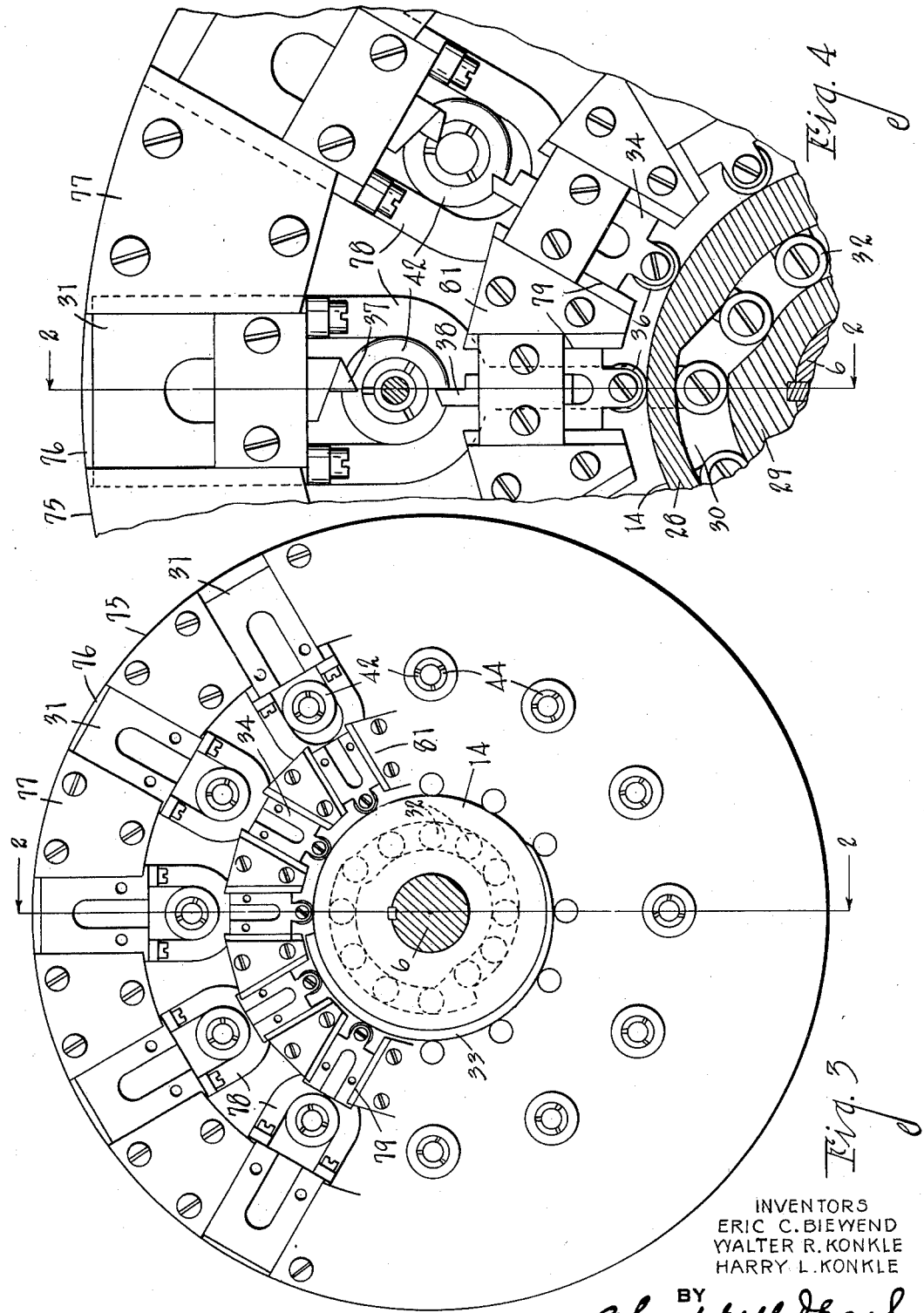

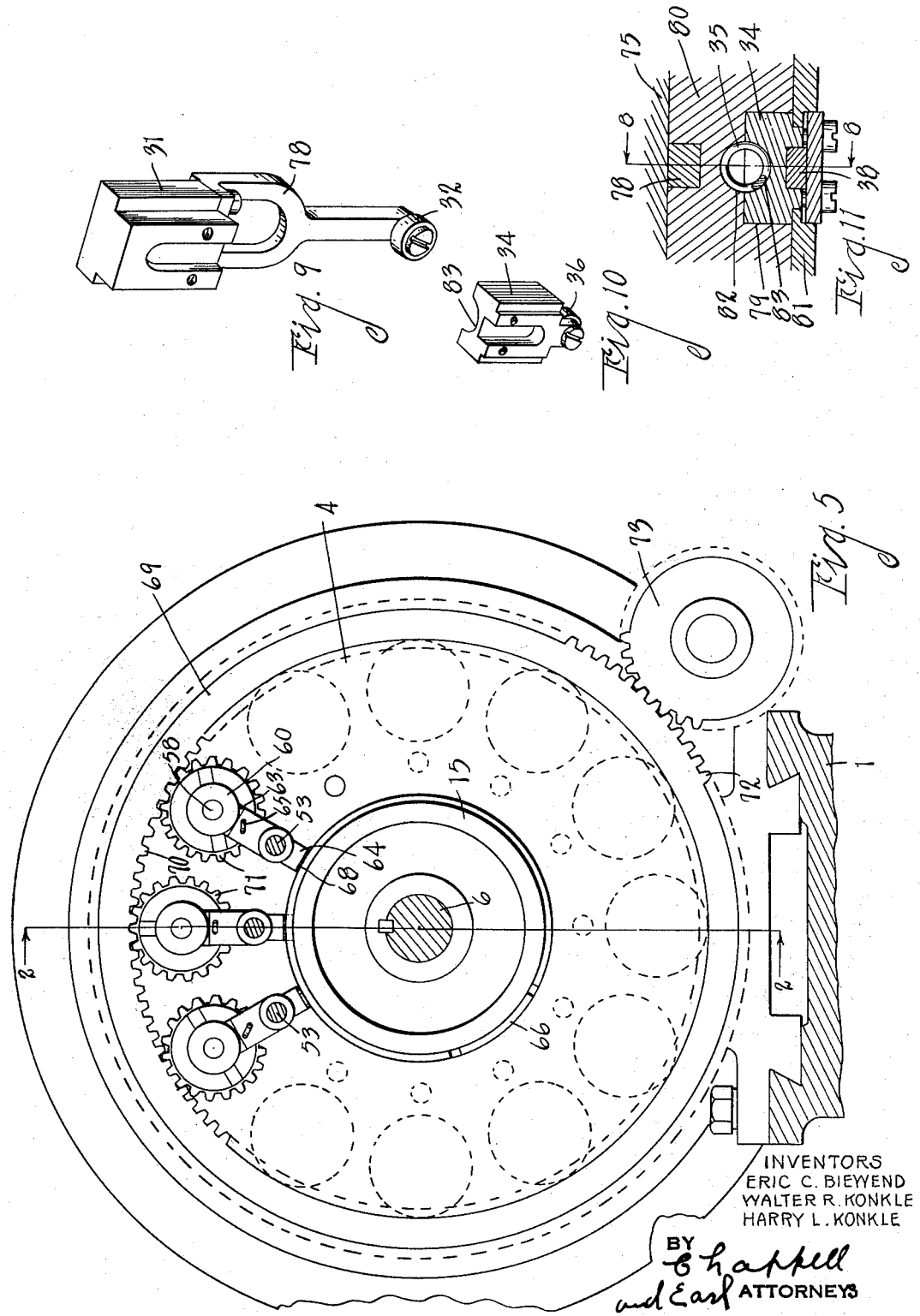

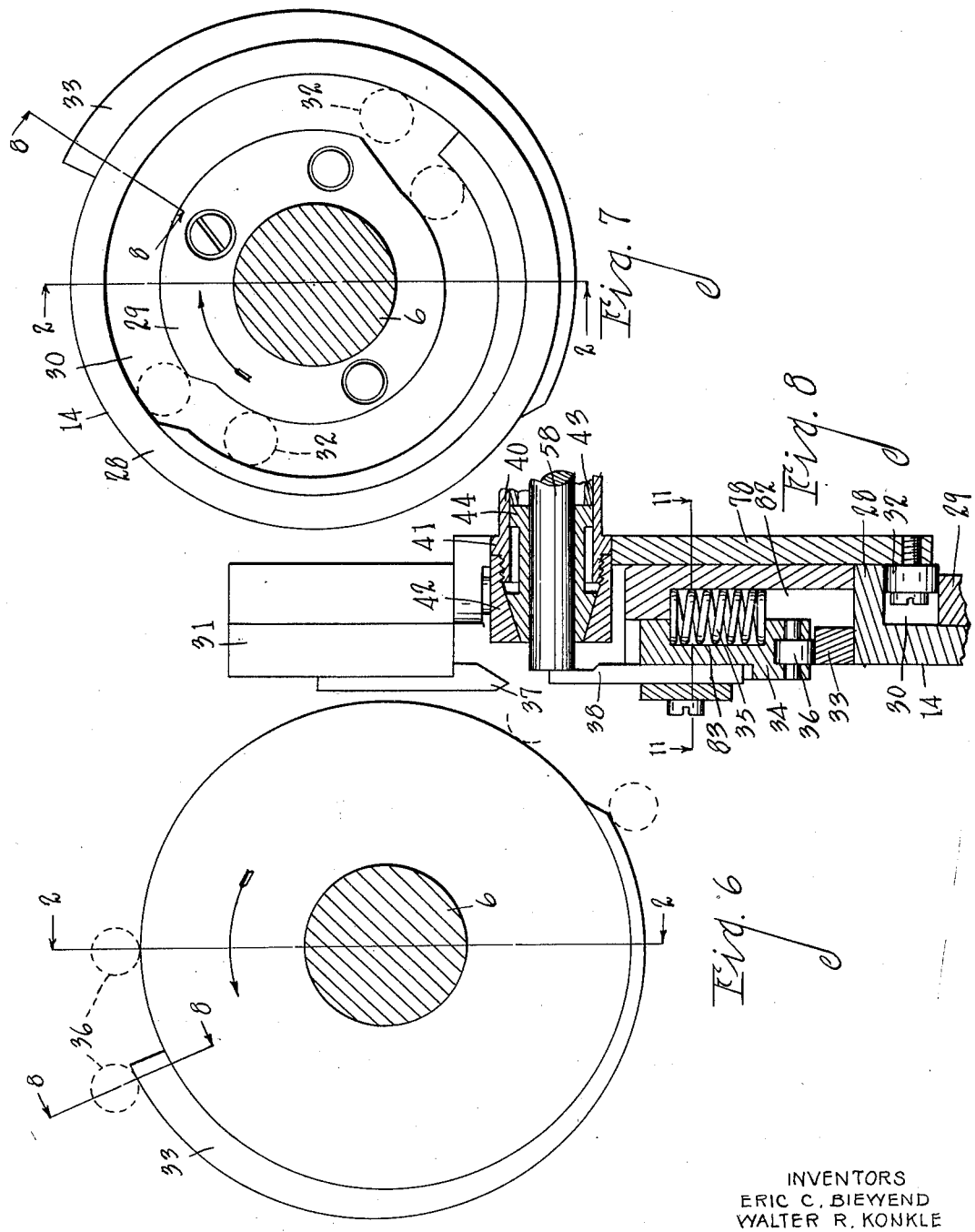

April 17, 1934.  E. C. BIEWEND ET AL  1,955,220
LATHE
Filed June 20, 1932   6 Sheets-Sheet 6
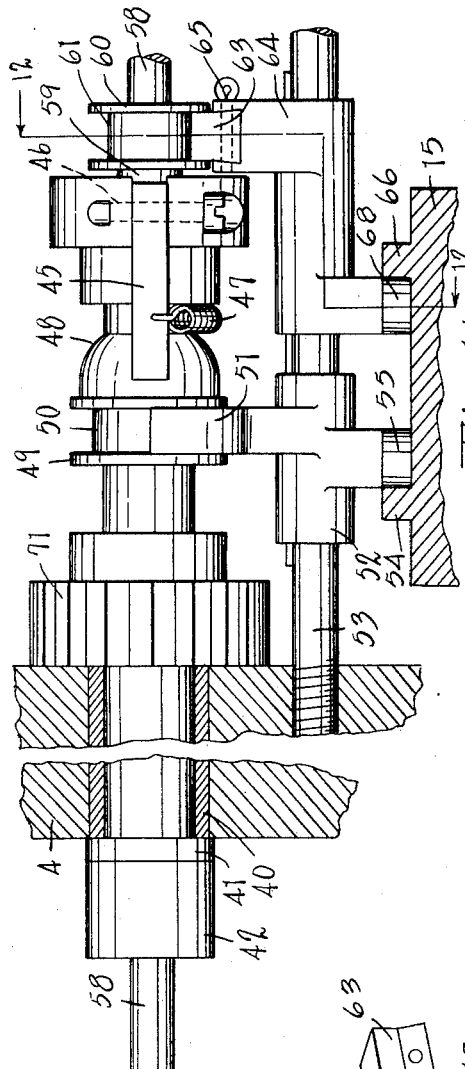
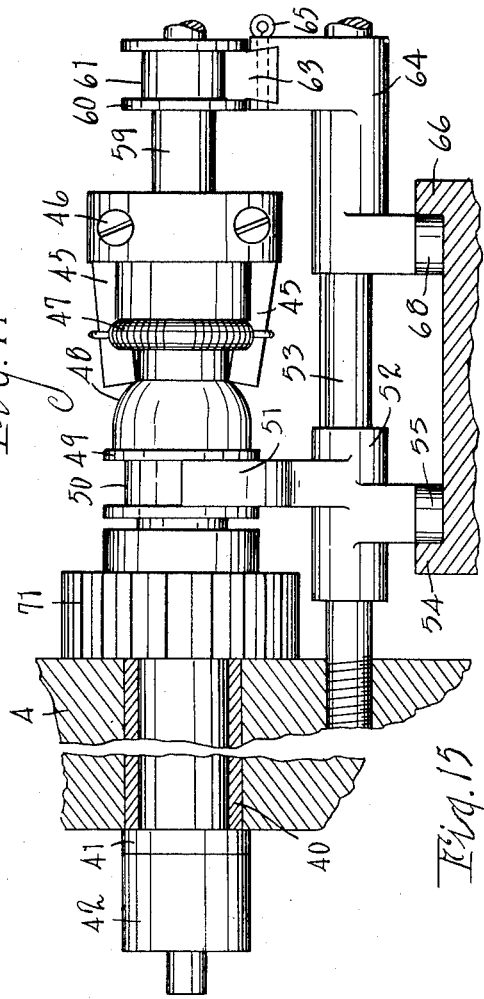
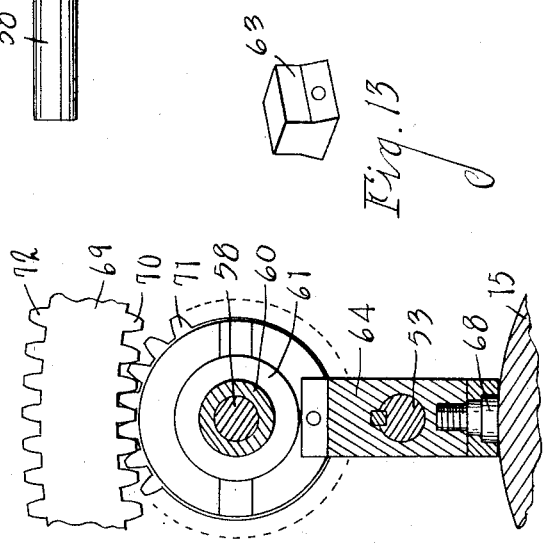
INVENTORS
ERIC C. BIEWEND
WALTER R. KONKLE
HARRY L. KONKLE
BY
Chappell & Earl
ATTORNEYS Patented Apr. 17, 1934

1,955,220

UNITED STATES PATENT OFFICE 1,955,220

LATHE

Eric C. Biewend, Walter R. Konkle, and Harry L. Konkle, Albion, Mich.

Application June 20, 1932, Serial No. 618,160

22 Claims. (Cl. 82—3)

The main objects of this invention are:

First, to provide an improved screw machine type of lathe which, while compact in structure, is of very large capacity.

Second, to provide an improved lathe which is of large capacity and at the same time the rotating parts are driven at relatively low speed.

Third, to provide an improved lathe having these advantages which is automatic in its operation.

Objects relating to details and economies of our invention will appear from the description to follow. The invention is defined and pointed out in the claims.

A structure which is a satisfactory embodiment of our invention is illustrated in the accompanying drawings, in which:

Fig. 3 is an enlarged fragmentary transverse vertical section on a line corresponding to line 3—3 of Fig. 1 showing the relation of certain of the forming and cutoff tool holders.

Fig. 4 is an enlarged fragmentary transverse vertical section on a line corresponding to line 4—4 of Fig. 2.

Fig. 5 is an enlarged fragmentary transverse vertical section on a line corresponding to line 5—5 of Fig. 1, showing details of the head stock mechanism.

Fig. 6 is an enlarged detail view of the actuating cam for the cut-off tools.

Fig. 7 is an enlarged detail view of the actuating cam for the forming tools.

Fig. 8 is an enlarged detail view partially in section on line 8—8 of Figs. 6, 7 and 11.

Fig. 9 is a perspective view of a forming tool holder and its cam follower.

Fig. 10 is a perspective view of a cut-off tool holder and its cam follower.

Fig. 11 is a fragmentary detail section on a line corresponding to line 11—11 of Figs. 2 and 8.

Fig. 12 is an enlarged fragmentary view, mainly in section on a line corresponding to line 12—12 of Figs. 2 and 14.

Fig. 13 is a perspective view of a detachable tongue.

Fig. 14 is an enlarged fragmentary view mainly in side elevation of the cam actuated stock feed mechanism.

Fig. 15 is a view similar to Fig. 14, showing the feed mechanism in the act of advancing the stock.

Figure 1:
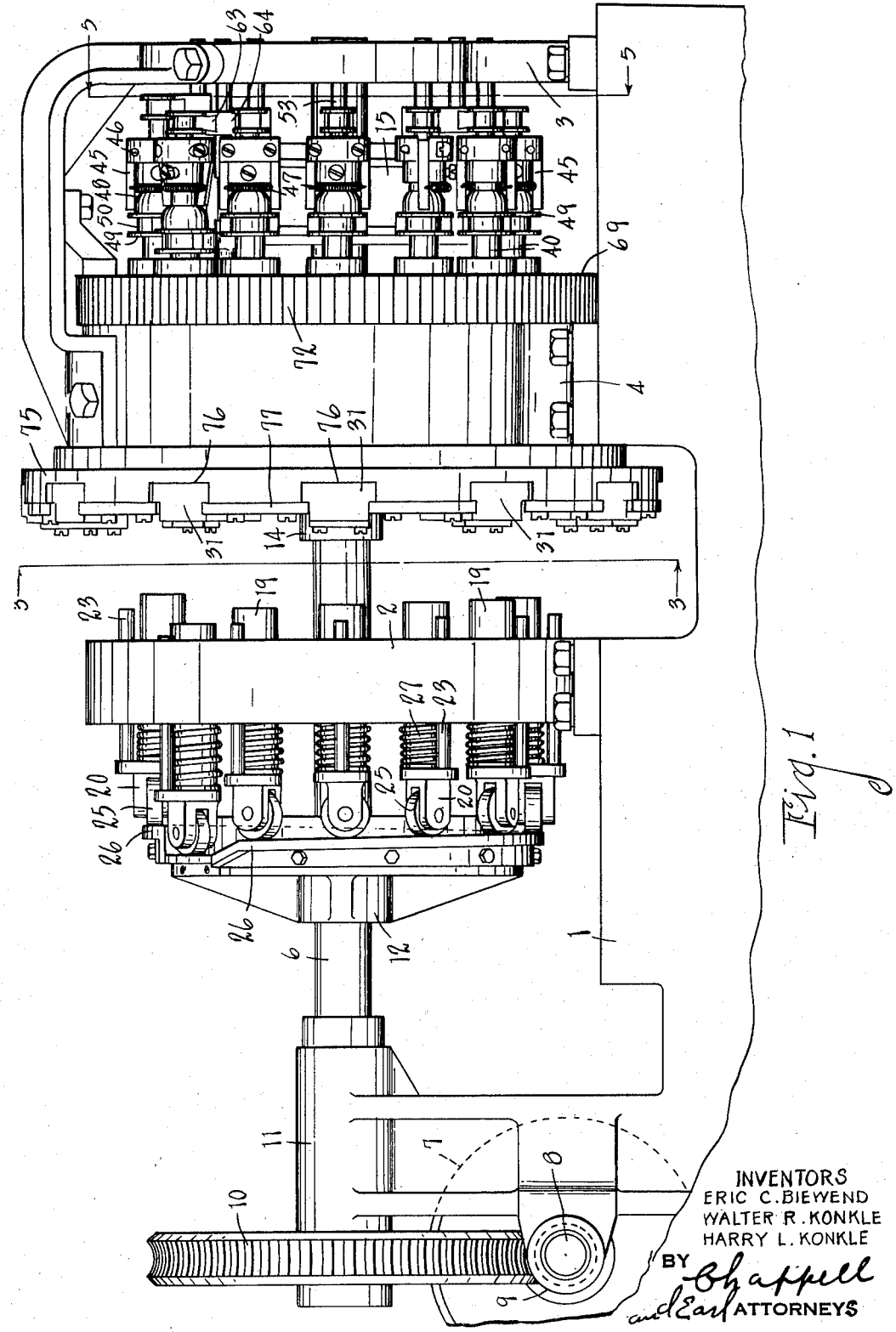
Fig. 1 is a fragmentary view in side elevation of a lathe embodying our invention.

In the embodiment of our invention illustrated in the accompanying drawings the base 1 is of suitable character to support the parts mounted thereon. On this base are spaced supports 2 and 3 and a central head or support 4. These supports are provided with alined bearings for the cam shaft 6 driven from a suitable source of power, not shown, through gear 7, shaft 8, worm 9 and gear 10. The outer end of this shaft 6 is supported by a bearing 11.

On the outer side of the support 2 we mount a tool actuating cam 12 keyed to the cam shaft 6 at 13. The tool actuating cam member 14 and the stock feed actuating cam 15 are secured to the cam shaft 6 by set screws 16 and 17, respectively. The support 2 constitutes a tool stock support, it being provided with a plurality of bore-like bearings 18 spaced uniformly around the cam shaft 6. A tail stock supporting slide 19 is mounted in each of these bearings. At their outer ends these slides are provided with brackets 20 and at their inner ends with tool stocks 21, the latter being adjustably secured to the slides by means of the set screws 22. These tool stocks are also provided with work supporting rolls 123 and with head shaping tools 124 in the embodiment of our invention illustrated.

The brackets 20 are provided with arms 23 slidable in the bores 24 disposed parallel to the bearings 18 so that the tool stock slides are supported against rotative movement. Each bracket 20 carries a cam follower roller 25 coacting with the cam ways 26 of the cam member 12. Springs 27 on the slides urge the cam followers against the cam and serve as return means for the tool stocks 21.

As the cam member 12 rotates the tool stocks 21 are actuated in timed sequence to and from the work so that each tool stock advances into operative relation to the work and the work supporting position, it being retracted after the other tool operating on the same piece of work, hereinafter described, has performed its function.

The cam member 14 is provided with a cammed flange 28 which coacts with the cammed collar 29 to provided a cam groove 30 for actuating the forming tool holders 31 which are mounted as hereinafter described. These tool holders 31 are provided with cam follower rollers 32 disposed in the cam groove 30 so that the tool holders are positively actuated in both directions or to and from the work. The cam 33 of the cam member 14 actuates the cut-off tool holders 34 which are retracted by the compression springs 35, each tool holder being provided with a cam follower roller 36 coacting with the cam 33. The mounting of these tool holders will be later described.

Each tool holder 31 is provided with a forming or shaping tool 37 and each tool holder 34 is provided with a cut-off tool 38. In Figs. 6-8, inclusive, we illustrate the relation of these cams and the tool holders. As shown in Fig. 6, as the cam 33 rotates the cam followers are successively actuated to move the cut-off tool holders 34 outwardly until the work is severed from the stock. As shown in Fig. 7 the forming tools are positively actuated by the slot-like cam to successively move the forming tool holders inwardly toward the work and then outwardly away from the work before the corresponding cut-off tool holder is fed to the work.

The central support carries a head plate 75 on which the coacting pairs of tools are radially mounted. This head plate is fixedly mounted on the support 4 and coacts therewith to provide the head member. The head member is provided with a plurality of bore-like openings 39 arranged in uniformly spaced relation around the cam shaft as a center, these openings receiving the work chucks and being alined with the tool stocks 21.

Each work chuck comprises a sleeve 40 disposed for rotating movement in the bearing opening 39 and having a shouldered portion 41 on which the chuck head 42 is threaded. Slidably disposed within the sleeve 40 is the tubular jaw control member 43 coacting with the jaws 44 externally tapered to fit the internally tapered chuck head. The member 43 is actuated by the levers 45 pivoted at 46, the free ends of these levers being urged inwardly by the tension spring 47 into coacting relation with the cam surface 48 of the collar 49. This collar 49 is slidably mounted on the sleeve 43 and provided with an annular groove 50 which is engaged by the tongue 51 of the cam follower 52 slidably mounted on the slide rod 53. This rod is supported by the support 3 and the head member 4 in parallel relation to the cam shaft 6, see Fig. 2.

The work feeding cam 15 has a peripheral rib-like cam member 54 with which the roller 55 on the cam follower 52 coacts. This cam member 54 has a recess 57 therein in opposed relation to the lug 56 so that as the cam rotates the chuck jaw members are released and re-engaged on each revolution of the cam member 15. The stock 58 is in the form of rods and is automatically advanced or fed while the chuck is released.

The feed means in the embodiment illustrated comprises the friction tubular clutch member 59 disposed within the tubular control member of the chuck, the end of this friction clutch member 59 being provided with a collar 60 having a groove 61 with which the detachable tongue 63 of the cam follower 64 engages. The tongue 63 has dove-tailed engagement with the cam follower and is held in place by the cotter pin 65 which may be readily removed to detach the tongue from the follower, thereby stopping the feeding of the work.

The cam member 15 is provided with a rib-like cam 66 having a drop 66' opposite the lug or tappet 67. As the drum or cam member 15 rotates the lug 67 engages the roller 68 on the cam follower 64 reciprocating the cam follower outwardly on the rod 53 and with it the work feeding clutch 59. The work is held against longitudinal movement during this period by the chuck. When the work is released by the chuck the surface 67 of the cam coacts with the follower 64 to feed the stock. The cam member 56 is arranged in such relation that as soon as the stock has been fed the chuck is re-engaged.

The work is driven preferably at a relatively low speed by the annular gear 69 rotatably mounted on the head member 4, this annular gear having internal teeth 70 meshing with the chuck driving gears 71. These gears are mounted on the chuck sleeves 40 which constitute supporting and driving spindles for the chucks. The annular gear has external teeth 72 meshing with the driving gear 73, the source of power not being illustrated.

Figure 2:
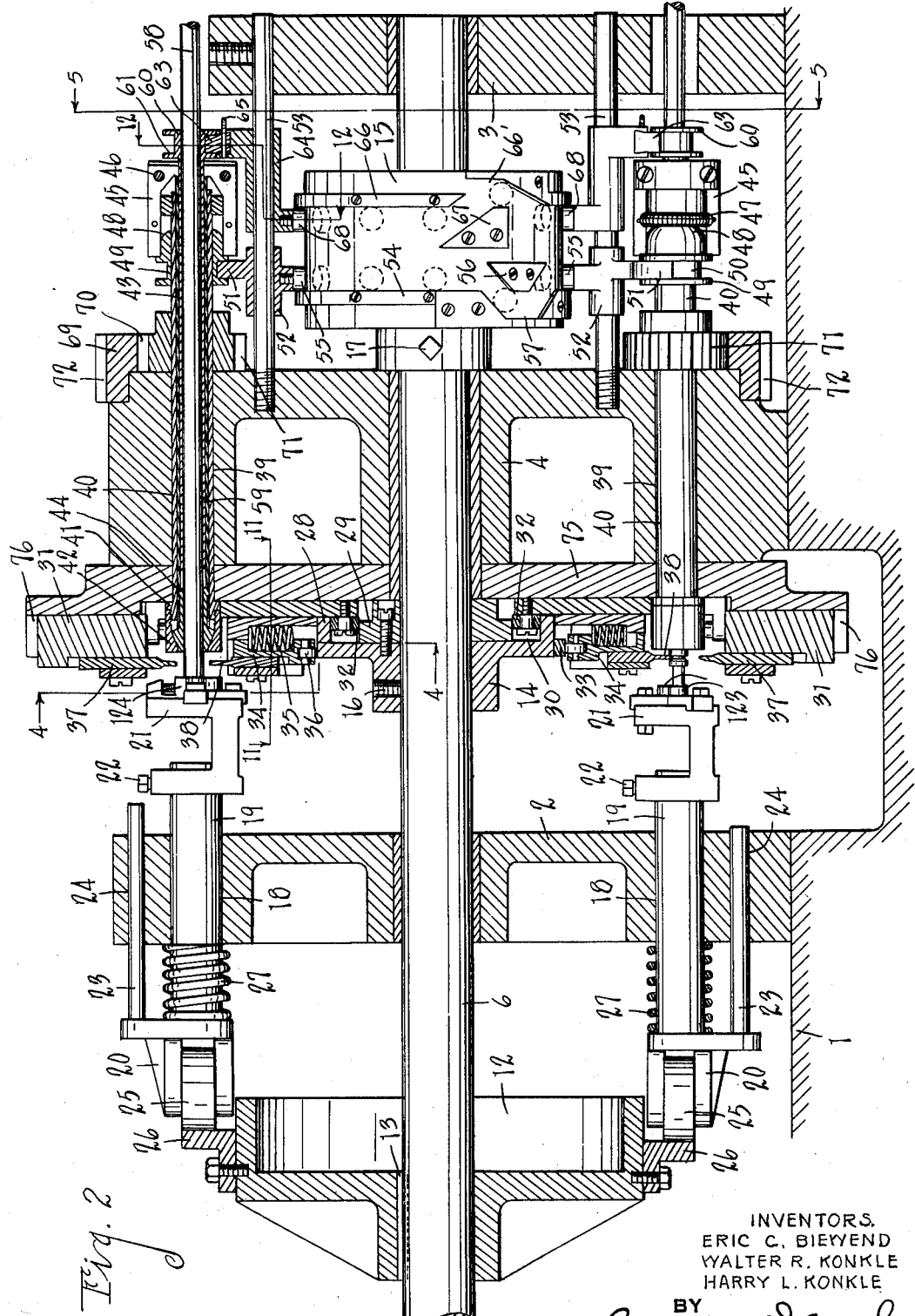
Fig. 2 is an enlarged fragmentary view in longitudinal vertical section on a line corresponding to line 2—2 of Figs. 3, 4, 5, 6 and 7.

The forming tool holders 31 and the cut-off tool holders are disposed in coacting pairs radially of the head plate 75, see Figs. 2, 3 and 4. The head plate is provided with radial ways 76 for the tool carriers 31, the tool carriers being detachably retained in these ways by the plates 77 arranged in overlapping relation to the tool carriers or holders. The cam follower rollers 32 are carried by the bifurcated arms 78 on the tool holders, these arms being bifurcated to receive the work chucks and to permit the work to project between them.

The cut-off tool holders 34 are mounted in the radial ways 79 in the head member 80 which, for convenience in assembling, is formed separately from the head plate 75. The tool holders 34 are retained in the ways 79 by means of the plates 81, see Fig. 11. The coiled return springs 35 are seated in facing recesses 82 and 83 formed in the head member 80 and the tool holders, as clearly shown in Figs. 8 and 11.

This provides a very compact arrangement of parts and in the embodiment illustrated there are twelve units, the cam shaft and control cams being common to all of the units so that the stock is automatically fed and the tools automatically actuated in timed relation. The tools of several of the units are at work at the same time. This permits driving the work at a relatively low speed, thereby increasing the life of the cutters and avoiding overheating. At the same time the machine has a very large capacity.

Another advantage is that the rod feed of any particular unit may be rendered inoperative as occasion may require for the purpose of adjusting or sharpening the tools, it only being necessary to remove the driving lug or tongue 63 of the cam follower 64 of the particular unit.

A still further advantage is that there are no heavy rotating parts such as the turrets of turret lathes.

We have illustrated and described our improvements in an embodiment which we have found highly satisfactory. We have not attempted to illustrate or describe various adaptations which we contemplate as it is believed that this disclosure will enable those skilled in the art to which our invention relates to embody or adapt our improvements as may be desired.

Having thus described our invention what we claim as new and desire to secure by Letters Patent is:

1. A lathe provided with a cam shaft, a toolstock actuating cam on said shaft, a plurality of spring retracted toolstocks arranged around said shaft and supported for longitudinal reciprocatory movement by said cam parallel to said shaft, a double acting shaping tool actuating cam on said shaft, a plurality of shaping tools radially disposed around said shaft and supported for radial reciprocatory movement by said shaping tool actuating cam, a cutoff tool actuating cam on said shaft, a plurality of spring retracted cutoff tools radially disposed around said shaft opposite said shaping tool and supported for reciprocatory movement by said cutoff tool actuating cam, a work support having headstocks for positioning the work around and parallel to said shaft in line with said toolstocks, means including a cam on said shaft for advancing the work in timed squence with the operation of said toolstock and tools, and means for rotating said headstocks.

2. A lathe provided with a central cam shaft, a plurality of spring retracted toolstocks arranged around said shaft and supported for longitudinal reciprocatory movement parallel to said shaft, a plurality of shaping tools radially disposed around said shaft and supported for radial reciprocatory movement, a plurality of spring retracted cutoff tools radially disposed around said shaft opposite said shaping tool and supported for reciprocatory movement, cams on said central cam shaft for actuating said toolstocks and tools, a work support having headstocks for positioning the work around and parallel to said shaft in line with said toolstocks, means including a cam on said shaft for advancing the work through said headstocks in timed sequence with the operation of said toolstock and tools, and means for rotating said headstocks.

3. A lathe provided with a central cam shaft, a toolstock actuating cam on said shaft, a plurality of spring retracted toolstocks arranged around said shaft and supported for longitudinal reciprocatory movement by said cam parallel to said shaft, a double acting shaping tool carrier actuating cam on said shaft, a plurality of shaping tool carriers radially disposed around said shaft and supported for radial reciprocatory movement by said shaping carrier actuating tool cam, a cutoff tool carrier actuating cam on said shaft, a plurality of spring retracted cutoff tool carriers radially disposed tool carriers radially disposed around said shaft opposite said shaping tool carriers and supported for radial reciprocatory movement by said cutoff tool carrier actuating cam, a work support having headstocks for positioning the work around and parallel to said shaft in line with said toolstocks, cams on said shaft for advancing the work in timed sequence with the operation of said toolstock and tools, and means for rotating said headstocks.

4. A lathe provided with a central cam shaft, a toolstock actuating cam on said shaft, a plurality of spring retracted toolstocks arranged around said shaft and supported for longitudinal reciprocatory movement by said cam parallel to said shaft, a tool carrier actuating cam on said shaft, a plurality of tool carriers radially disposed around said shaft and supported for radial reciprocatory movement by said tool carrier actuating cam, a work support having headstocks for positioning the work around and parallel to said shaft in line with said toolstocks, cams on said shaft for advancing the work in timed sequence with the operation of said toolstock and tools, and means for rotating said headstocks.

5. A lathe machine provided with a plurality of circumferentially arranged work revolving lathes having non-revolving head forming tools and radially disposed cutters associated therewith, a central cam shaft, and cams on said cam shaft for actuating the tools and cutters of said lathes independently and in timed sequence with each other.

6. A machine of the class described, comprising a central shaft, a plurality of work revolving lathes arranged circumferentially around and fixed relative to said shaft, and means on said shaft for operating the lathes independently of but in timed sequence with each other whereby each individual lathe completes all forming operations.

7. An automatic screw machine comprising a central shaft, a plurality of lathes arranged circumferentially around said shaft for individually completing all forming operations, each of said lathes having longitudinal work feeding means, a non-revolving longitudinal head forming toolstock and radial end shaping and cutoff tool carriers, means including cams on said shaft for actuating said work feeding means to advance the work, for advancing the toolstock to form a head on the end of the work and for actuating the end shaping tool carrier and the cutoff tool carrier to finish the piece, and means for rotating the work continuously.

8. In a lathe, the combination with a stationary head member having a plurality of work chucks disposed in an annular series, feeding clutches operatively associated with said chucks, a cam shaft disposed centrally of said series of chuck, coacting pairs of tool holders mounted on said head member to reciprocate in planes radial to said shaft, cams on said shaft coacting with and common to all of the corresponding tool holders of the pairs for actuating them in timed relation, operating means for said chucks and clutches comprising cams on said shaft common to all of said chucks and feed clutches, an annularly disposed series of non-revolving tool stocks mounted to reciprocate in planes parallel to said cam shaft, said tool stocks being provided with work supporting rolls disposed in opposed relation to the tools carried by the tool stock, and a tool stock actuating cam on said cam shaft common to all of said tool stocks.

9. In a lathe, the combination with a stationary head member having a plurality of work chucks disposed in an annular series, feeding clutches operatively associated with said chucks, a cam shaft disposed centrally of said series of chucks, coacting pairs of tool holders mounted on said head member to reciprocate in planes radial to said shaft, cams on said shaft coacting with and common to all of the corresponding tool holders of the pairs for actuating them in timed relation, operating means for said chucks and clutches comprising cams on said shaft common to all of said chucks and feed clutches, an annularly disposed series of non-revolving tool stocks mounted to reciprocate in planes parallel to said cam shaft, and a tool stock actuating cam on said cam shaft common to all of said tool stocks.

10. In a lathe, the combination with a stationary head member having a plurality of work chucks disposed in an annular series, feeding clutches operatively associated with said chucks, a cam shaft disposed centrally of said series of chucks, coacting pairs of tool holders mounted on said head member to reciprocate in planes radial to said shaft, cams on said shaft coacting with and common to all of the corresponding tool holders of the pairs for actuating them in timed relation, operating means for said chucks and clutches comprising cams on said shaft common to all of said chucks and feed clutches.

11. In a lathe, the combination with a stationary head member having a plurality of work chucks disposed in an annular series, feed means operatively associated with said chucks, a cam shaft disposed centrally of said series of chucks, coacting tool holders mounted on said head member to reciprocate in planes radial to said shaft, a cam on said shaft coacting with and common to all of said tool holders for actuating them in timed relation, operating means for said chucks and feed means comprising cams on said shaft common to all of said chucks and feed means, an annularly disposed series of non-revolving tool stocks mounted to reciprocate in planes parallel to said cam shaft, said tool stocks being provided with work supports disposed in opposed relation to the tools carried by the tool stock, and a direct progressive tool stock actuating cam on said cam shaft common to all of said tool stocks.

12. In a lathe, the combination with a non-rotating head member having a plurality of work chucks disposed in an annular series, feed means operatively associated with said chucks, a cam shaft disposed centrally of said series of chucks, coacting tool holders mounted on said head member to reciprocate in planes radial to said shaft, a cam on said shaft coacting with and common to all of said tool holders for actuating them in timed relation, operating means for said chucks and feed means comprising cams on said shaft common to all of said chucks and feed means, an annularly disposed series of non-revolving tool stocks mounted to reciprocate in planes parallel to said cam shaft, and a direct progressive tool stock actuating cam on said cam shaft common to all of said tool stocks.

13. In a lathe, the combination with a non-rotating head member having a plurality of work chucks disposed in an annular series, feed means operatively associated with said chucks, a cam shaft disposed centrally of said series of chucks, coacting tool holders mounted on said head member to reciprocate in planes radial to said shaft, a cam on said shaft coacting with and common to all of said tool holders for progressively actuating them in timed relation, and progressive operating means for said chucks and feed means comprising cams on said shaft common to all of said chucks and feed means.

14. In a lathe, the combination of a plurality of work chucks grouped about a common center, feed means operatively associated with said chucks, a cam shaft disposed centrally of said chucks, pairs of forming and cut-off tools disposed radially of said shaft, cams on said shaft for progressively actuating said forming and cut-off tools common to all of them, cams on said shaft for progressively actuating said chucks and feed means common to all of them, pinions on said chucks, an annular gear coacting with the several pinions, non-revolving tool stocks mounted to reciprocate axially of said chucks and provided with work supports, and a cam on said shaft for progressively actuating said tool stocks.

15. In a lathe, the combination of a plurality of work chucks grouped about a common center, feed means operatively associated with said chucks, a cam shaft disposed centrally of said chucks, pairs of forming and cut-off tools disposed radially of said shaft, cams on said shaft for progressively actuating said forming and cut-off tools common to all of them, cams on said shaft for progressively actuating said chucks and feed means common to all of them, pinions on said chucks, and an annular gear coacting with the several pinions.

16. In a lathe, the combination of a plurality of work chucks grouped about a common center, feed means operatively associated with said chucks, a cam shaft disposed centrally of said chucks, pairs of forming and cut-off tools disposed radially of said shaft, cams on said shaft for actuating said forming and cut-off tools common to all of them, cams on said shaft for actuating said chucks and feed means common to all of them, non-revolving tool stocks mounted to reciprocate axially of said chucks and provided with work supports, and a cam on said shaft acting to progressively advance said tool stocks.

17. In a lathe, the combination of a plurality of work chucks grouped about a common center, feed means operatively associated with said chucks, a cam shaft disposed centrally of said chucks, pairs of forming and cut-off tools disposed radially of said shaft, cams on said shaft for progressively actuating said forming and cut-off tools common to all of them and cams on said shaft for actuating said chucks and feed means common to all of them.

18. In a lathe, the combination of a plurality of work chucks grouped about and fixed relative to a common center, a cam shaft disposed centrally of said series of chucks, coacting tools disposed radially of said shaft, a cam on said shaft common to all of said tools, a cam on said shaft for actuating said chucks, non-revolving tool stocks mounted to reciprocate axially of said chucks, and a cam on said shaft for actuating said tool stocks.

19. In a lathe, the combination of a plurality of work chucks grouped about and fixed relative to a common center, a cam shaft disposed centrally of said series of chucks, coacting tools disposed radially of said shaft, a cam on said shaft common to all of said tools, and a cam on said shaft for progressively actuating said chucks.

20. In a lathe, the combination of a plurality of work chucks grouped about and fixed relative to a common center, a cam shaft disposed centrally of said series of chucks, coacting tools disposed radially of said shaft, a cam on said shaft common to all of said tools, a cam on said shaft for progressively actuating said chucks, pinions on said chucks, and a gear coacting with the several pinions.

21. In a lathe, the combination of a plurality of units grouped about a common center each comprising a work chuck and feed means, a forming and a cut-off tool disposed to reciprocate radially of said center, non-revolving tool stocks provided with work holder means mounted to reciprocate axially of the work holders, actuating cams common to all of said units, and driving means for said work chucks common to all of them.

22. A lathe provided with a central cam shaft, a toolstock actuating cam on said shaft, a plurality of non-revolving toolstocks arranged around said shaft and supported for longitudinal reciprocatory movement by said cam parallel to said shaft, a tool carrier actuating cam on said shaft, a plurality of tool carriers radially disposed around said shaft and supported for radial reciprocatory movement by said tool carrier actuating cam, a work support having headstocks for positioning the work around and parallel to said shaft in line with said toolstocks, cams on said shaft for advancing the work in timed sequence with the operation of said toolstock and tools, and means for rotating said headstocks.

ERIC C. BIEWEND.
WALTER R. KONKLE.
HARRY L. KONKLE.